United States Patent [19]

Casagrande et al.

[11] Patent Number: 4,966,957

[45] Date of Patent: Oct. 30, 1990

[54] LIQUID-CRYSTALLINE, THERMOTROPIC AROMATIC POLYESTER FROM HYDROQUINONE MIXTURE

[75] Inventors: Francesco Casagrande; Marco Foá, both of Novara; Andrea Gardano, Trino; L. Lawrence Chapoy, Lesa, all of Italy

[73] Assignee: Montedison S.p.A., Milan, Italy

[21] Appl. No.: 288,307

[22] Filed: Dec. 22, 1988

[30] Foreign Application Priority Data

Dec. 24, 1987 [IT] Italy .................................. 23220 A/87

[51] Int. Cl.$^5$ ........................ C08G 8/02; C08G 63/02; C08G 63/00

[52] U.S. Cl. .................................. 528/193; 528/125; 528/128; 528/176; 528/191

[58] Field of Search ............... 528/176, 191, 193, 125, 528/128

[56] References Cited

U.S. PATENT DOCUMENTS 4,529,565 7/1985 Kasatani et al. .................... 528/194

Primary Examiner—Harold D. Anderson
Assistant Examiner—T. Mosley
Attorney, Agent, or Firm—Stevens, Davis, Miller & Mosher

[57] ABSTRACT

Liquid-crystalline, thermotropic, aromatic polyesters processable in the molten state, comprising units derived from hydroquinones substituted with aryl, aralkyl and aroyl groups, and from phenoxy-hydroquinone.

10 Claims, No Drawings

LIQUID-CRYSTALLINE, THERMOTROPIC AROMATIC POLYESTER FROM HYDROQUINONE MIXTURE

DESCRIPTION OF THE INVENTION

The present invention relates to liquid-crystalline, thermotropic, aromatic polyesters.

More particularly, the present invention relates to liquid-crystalline, thermotropic, aromatic polyesters easily processable in the molten state, and having the mesogen group in their main chain.

Thermotropic polyesters, which hence show an optical anisotropy in the molten state, are products known and described in many examples in the technical literature, such as in British Polymer Jounral (Dec. 1980), page 154: "Liquid Crystal Polymer"; Journal of Macromolecular Science-Chemistry (1984), page 1705: "Liquid Crystalline Aromatic Polyesters"; Die Angewandte Makromolekulare Chemie (1982), 109–110, page 1: "Rigid Chain Polymers"; Die Angewandte Makromolekulare Chemie (1986), 145–146, page 231: "Thermotropic Liquid Crystalline Polymers"; and Journal of Molecular Science Review (1986), page 551: "Liquid Crystalline Polymers: A Novel State of Material".

The use of such polyesters makes it possible for high-tenacity fibers or molded articles to be obtained from the material in the molten state, such as, e.g., by injection-molding, and which articles are endowed with suitable characteristics of rigidity, hardness and toughness.

The polymers showing the above-stated properties are generally easily processable in the molten state, highly resistant to heat and oxidation and furthermore, thanks to their crystallinity, such polymers display high HDT (Heat Distorsion Temperature) values and are highly resistant to attack by solvents.

Liquid-crystalline, thermotropic polyesters having the above mentioned characteristics, and particularly suitable for preparing fibers or films, are disclosed in U.S. Pat. No. 4,529,565. As disclosed in this patent, polyesters optically anisotropic in the molten state are those which contain units respectively derived from phenoxy-hydroquinone, from aromatic diols of the formula:

HO—Ar—OH, (I)

and from terephthalic acid, possibly in mixture with p-hydroxybenzoic acid.

By the radical "Ar," there are herein meant either an oxy-4,4'-diphenylene radical, or a limited and well-defined group of aromatic radicals, wherein the ring may be a single ring, a double ring, or a condensed ring, possibly substituted with at least one methyl group, or with one chlorine atom.

In said U.S. Pat. No. 4,529,565, it is stated that the presence of the unit derived from phenoxy-hydroquinone has the effect of reducing the crystallinity of the polymer and of lowering the melting point thereof, but in order to obtain this result it is necessary that such a unit be present in an amount higher that 50% by mols, and preferably within the range of from 80 to 90% by mols, as referred to the total of the aromatic diols used.

In accordance with the present invention, it has now been discovered that liquid-crystalline, thermotropic, polyesters easily processable in the molten state may be prepared by using a mixture of aromatic diols with a content of phenoxy-hydroquinone lower than 50% by mol, if such diols are hydroquinones substituted with alkyl, aralkyl or aroyl groups.

Therefore, the object of the present invention is to provide liquid-crystalline, thermotropic, aromatic polyesters comprising:

(a) units derived from at least one aromatic or cycloaliphatic dicarboxy acid;

(b) units derived from at least one hydroquinone substituted with an aryl and/or aralkyl and/or aroyl group containing from 6 to 20 carbon atoms; and (c) units derived from hydroquinones having the formula:

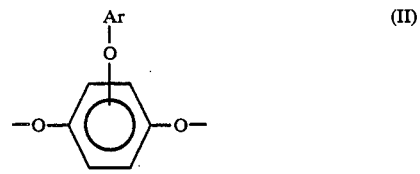

wherein Ar represents a simple, double or condensed aryl radical, possibly substituted with inert groups such as the halogens, or ($C_1$–$C_4$)-alkyl radicals.

According to a preferred form of a practical embodiment of the polyesters of the present invention, the aromatic or cycloaliphatic dicarboxy acid is present to the extent of at least 90 mol % in the isomeric form having mutually parallel or coaxial carboxy groups.

Examples of dicarboxy acids are terephthalic acid, chloro- or bromo-terephthalic acid, methyl-terephthalic acid, 1,4-naphthalene-dicarboxy acid, 1,5-naphthalene-dicarboxy acid and 2,6-naphthalene-dicarboxy acid, 4,4'-di-phenyl-dicarboxy acid, 3,3'-dibromo-4,4'-di-phenyl-dicarboxy acid, 4,4'-stilbene-dicarboxy acid, cyclohexane-dicarboxy acid, and so forth.

Any hydroquinones substituted with the above mentioned groups may be used in the preparation of the aromatic polyesters of the present invention, although phenyl-hydroquinone, (1-phenyl-ethyl-hydroquinone, 2-(α-phenyl-isopropyl)-hydroquinone, benzoyl-hydroquinone, and so forth, are preferred.

Examples of hydroquinones of the formula (II) are phenoxy-hydroquinone, chloro-phenoxy-hydroquinone, methylphenoxy-hydroquinone, tert.-butyl-phenoxy-hydroquinone, and so forth.

According to a further preferred form of a practical embodiment of the liquid-crystalline, thermotropic, aromatic polyesters of the present invention, the units derived from the dicarboxy acid are in the equimolecular ratio with respect to the units derived from such hydroquinones as defined under (b) and (c), whilst these latter are in molar ratios of (c)/(b) lower than 1, and preferably within the range of from 0.15 to 0.8.

As already indicated, the units derived from the hydroquinones as defined under (b) may be used either individually, or mixed with one another.

The polymers according to the present invention are optically anisotropic in the molten state, as can be verified by means of optical microscopy analysis under polarized light, and have an inherent viscosity, as measured in a 1:1 mixture of trifluoroacetic acid and methylene chloride at 30° C. at a concentration of 2.5 g/liter, within the range of from 0.3 to 6 dl/g.

As an alternative, other solvents, such as, e.g., pentafluorophenol at 60° C., may be used as well.

The melting temperature may vary over a wide range, according to the composition of the polymer and the degree of polymerization; generally, such melting temperature is within the range of from 200° to 350° C.

The molecular weight and the crystallinity may be increased by heating the polymer particles in an inert medium, or under vacuum, at a temperature just under the melting point, for a time ranging from 1 to 20 hours.

The aromatic polyesters according to the present invention are well suited for use to obtain manufactured articles which may be prepared by means of the usual technologies of fabrication of thermoplastic polymers such as, e.g., injection molding or extrusion. They may be processed to yield films or fibers, used as matrices for composite materials containing inorganic fibers or fillers, and used in the preparation of blends with other polymers.

The preparation of the liquid-crystalline, polyesters according to the present invention may be carried out by means of conventional techniques, by reacting the above mentioned units available from the market, or easily preparable by means of the usual techniques of organic chemistry, i.e., according to conventional techniques, under the normal conditions of preparation of polyester resins.

For example, said polyesters may be obtained in the molten state, or in the presence of a dispersing vehicle having a high boiling point, such as di-phenyl-sulphone, or mixtures of partially hydrogenated terphenyls, by transesterification between the dicarboxy aromatic acids and the acetates or propanoates of the phenols, at temperatures within the range of from 270° to 370° C., so as to favor the complete release of the carboxy acids, including operating under vacuum.

The reaction may optionally be carried out in the presence of a transesterficiation catalyst such as, e.g., alkali metal or alkaline-earth metal phosphates.

Further catalyst may be those which are commonly used in polycondensation processes, and are described in "Encyclopaedia of Polymer Science and Technology" (1969, Vol. 10, pages 722-723).

Examples of such catalysts are the oxides, hydroxides, hydrides, halides, alkoxides or phenates, the salts and the complex salts of the organic or inorganic acids of lithium, sodium, potassium, magnesium, calcium, titanium, manganese, cobalt, zinc, tin, antimony, lanthanum, cerium, lead, and germanium.

The required amount of catalyst is within the range of from 0.005 to 1% by mol, and is preferably within the range of from 0.01 to 0.2% by mol, as computed relative to the total amount of the reactants.

According to an alternative method, the liquid-crystalline polyesters of the present invention may be obtained in solution, by polycondensation between the halides of the dicarboxy aromatic acids and the mixture of the phenols in a suitable solvent. The temperature is within the range of from 25° to 220° C., and the reaction is carried out in the presence of a base and/or of a stream of nitrogen in order to favor the elimination of the hydrogen halide.

Among the bases, pyridine is preferred, whilst among the solvents, the chlorinated, both aliphatic and aromatic, solvents, are prefered, such as methylene chloride, chlorobenzene, dichloro-benzenes and trichloro-benzenes.

The so-obtained polymer is subsequently recovered by evaporating the solvent, or by precipitation with a non-solvent, and subsequent filtration.

In order still better to understand the present invention and to practice it, some illustrative, non-limitative examples are reported below:

EXAMPLE 1

To a 4-neck glass flask of 100 cc of capacity equipped with mechanical stirring means, condenser, and nitrogen inlet tube, 2.77 g (13.6 mM) of terephthalic acid dichloride, 1.46 g (6.8 mM) of (1-phenylethyl)-hydroquinone, 0.63 g (3.4 mM) of phenyl-hydroquinone, 0.68 g (3.4 mM) of phenoxy-hydroquinone, and 60 cc of 1,2,4-trichloro-benzene are charged under a slow nitrogen stream.

The reaction mixture is kept 30 minutes at room temperature with stirring and under a nitrogen stream, and then heating is started and the temperature is increased up to 220° C. by using a silicone-oil bath.

The reaction mixture is maintained at this temperature for 10 hours until the evolution of HCl ends. At the end of the polymerization, the reaction mixture has the appearance of a jelly-like solution of light color.

Still under a nitrogen stream, and with stirring, the oil bath is removed, and the reaction mixture is allowed to cool. When it reaches the temperature of 50° C., the reaction mixture is poured into acetone and the precipitate is filtered off.

The so-obtained polymer is washed with acetone (twice), hot water, (twice), and acetone/methanol (twice).

The end product is dried under vacuum for 4 hours at 170°-180° C. 4.34 g are obtained with a yield of 95% of theoretical.

The dried polymer has a melting temperature (Tm) of about 332° C., and an inherent viscosity of 3.0 dl/g (as measured at the temperature of 30° C. in a solvent composed of the same volumes of trifluoroacetic acid and methylene chloride, at the concentration of 2.5 g/liter.

The molten polymer is optically anisotropic when observed at the microscope under polarized light.

The melting temperature is determined by means of D.S.C. (Differential Scanning Calorimetry) at a scanning speed of 20° C./min).

EXAMPLE 2

To the same equipment as of Example 1, and under the same conditions, 2.03 g (10 mM) of terephthalic acid dichloride, 1.30 g (7 mM) of phenyl-hydroquinone, 0.60 g (3 mM) of phenoxy-hydroquinone and 40 cc of 1,2,4-trichlorobenzene are charged.

The reaction is then carried out as described in Example 1, with the reaction mixture being maintained at 220° C. for 11 hours.

2.89 g (yield of 90% of theoretical) is obtained of dry polymer which has a melting temperature (Tm) of about 325° C., and an inherent viscosity of 5.5 dl/g (measured at the temperature of 60° C. in pentafluorophenol at the concentration of 2.5 g/liter).

The molten polymer is optically anisotropic when observed at the microscope under polarized light.

EXAMPLE 3

To the same equipment as of Example 1, and under the same conditions, 2.03 g (10 mM) of terephthalic acid dichloride, 1.07 g (5 mM) of benzoyl-hydroquinone, 0.47 g (2.5 mM) of phenyl-hydroquinone, 0.51 g (2.5 mM) of phenoxy-hydroquinone, and 40 cc of 1,2,4-trichlorobenzene are charged.

The reaction is then carried out as described in Example 1, with the reaction mixture being maintained at 220° C. for 11 hours.

3.06 g is obtained of dry polymer (yield of 95% of theoretical), which has a melting temperature (Tm) of about 320° C., and an inherent viscosity of 1.8 dl/g (measured as described in Example 2).

The molten polymer is optically anisotropic when observed at the microscope under polarized light.

EXAMPLE 4

To the same equipment as of Example 1, and under the same conditions, 2.03 g (10 mM) of terephthalic acid dichloride, 1.47 g (6 mM) of (α-phenyl-isopropyl)-hydroquinone, 0.81 g (4 mM) of phenoxy-hydroquinone, and 45 cc of 1,2,4-trichlorobenzene are charged.

The reaction is then carried out as described in Example 1, with the reaction mixture being maintained at 220° C. for 12 hours.

3.22 g is obtained of dry polymer (yield of 93% of theoretical), which has a melting temperature (Tm) of about 284° C., and an inherent viscosity of 1.95 dl/g (measured as described in Example 1).

The molten polymer is optically anisotropic when observed at the microscope under polarized light.

What is claimed is:

1. A liquid-crystalline, thermotropic, aromatic containing polyester produced from the reactants:
   (a) at least one aromatic or cycloaliphatic dicarboxy acid;
   (b) at least one hydroquinone which is substituted by aryl having 6 to 20 carbon atoms, aralkyl having 6 to 20 carbon atoms, aroyl having 6 to 20 carbon atoms, or a combination thereof; and
   (c) a hydroquinone-derivative having the formula:

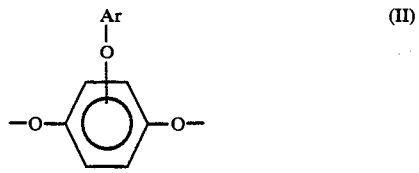

(II)

wherein Ar is a simple, double or condensed aryl radical, optionally substituted with inert groups;
wherein (a) is in a substantially equimolecular ratio with respect to (b) and (c) and the molar ration of (c)/(b) is less than 1.

2. A polyester according to claim 1, wherein the dicarboxy acid is present for at least 90 mol % in the isomeric form having the carboxy groups mutually parallel or coaxial.

3. A polyester according to claim 1 or 2, wherein the dicarboxy acids are selected from the class consisting of terephthalic acid, chloro-, bromoterephthalic acid, methyl-terephthalic acid, 1,4-naphthalene-dicarboxy acid, 1,5-naphthalene-dicarboxy acid, 2,6-naphthalene-dicarboxy acid, 4,4'diphenyl-dicarboxy acid, 3,3'-dibromo-4,4'-diphenyl-dicarboxy acid, 4,4'-stilbene-dicarboxy acid, and cyclohexane-dicarboxy acid.

4. A polyester according to claim 1 or 2, wherein the substituted hydroquinones (b) are selected from the class consisting of phenyl-hydroquinone, (1-phenylethyl)-hydroquinone, 2-(α-phenyl-isopropyl)-hydroquinone, and benzoyl-hydroquinone.

5. A polyester according to claim 1 or 2, wherein the hydroquinone of formula (II) is selected from the class consisting of phenoxyhydroquinone, chloro-phenoxyhydroquinone, methyl-phenoxyhydroquinone, and tert.-butyl-phenoxy-hydroquinone.

6. A polyester according to claim 1 wherein the inert groups are halogen or $C_1$–$C_4$ alkyl.

7. A polyester according to claim 1 or 2 wherein the molar ratio of (c)/(b) is 0.15 to 0.8.

8. A polyester according to claim 1 or 2, wherein the inherent viscosity, measured in a 1:1 mixture of trifluoroacetic acid and methylene chloride at 30° C., or in pentafluorophenol at 60° C., at a concentration of 2.5 g/liter, is within the range of from 0.3 to 6 dl/g, and has a melting temperature within the range of from 200° to 350° C.

9. A fiber, a film, or a shaped article formed by injection or extrusion of the polyester according to claim 1 or 2.

10. A composite material containing as a matrix the polyester according to claims 1 or 2 and an inorganic fiber or filler.

* * * * *